Aug. 14, 1951     F. J. COLLINS     2,563,922
ARMREST
Filed Nov. 15, 1946
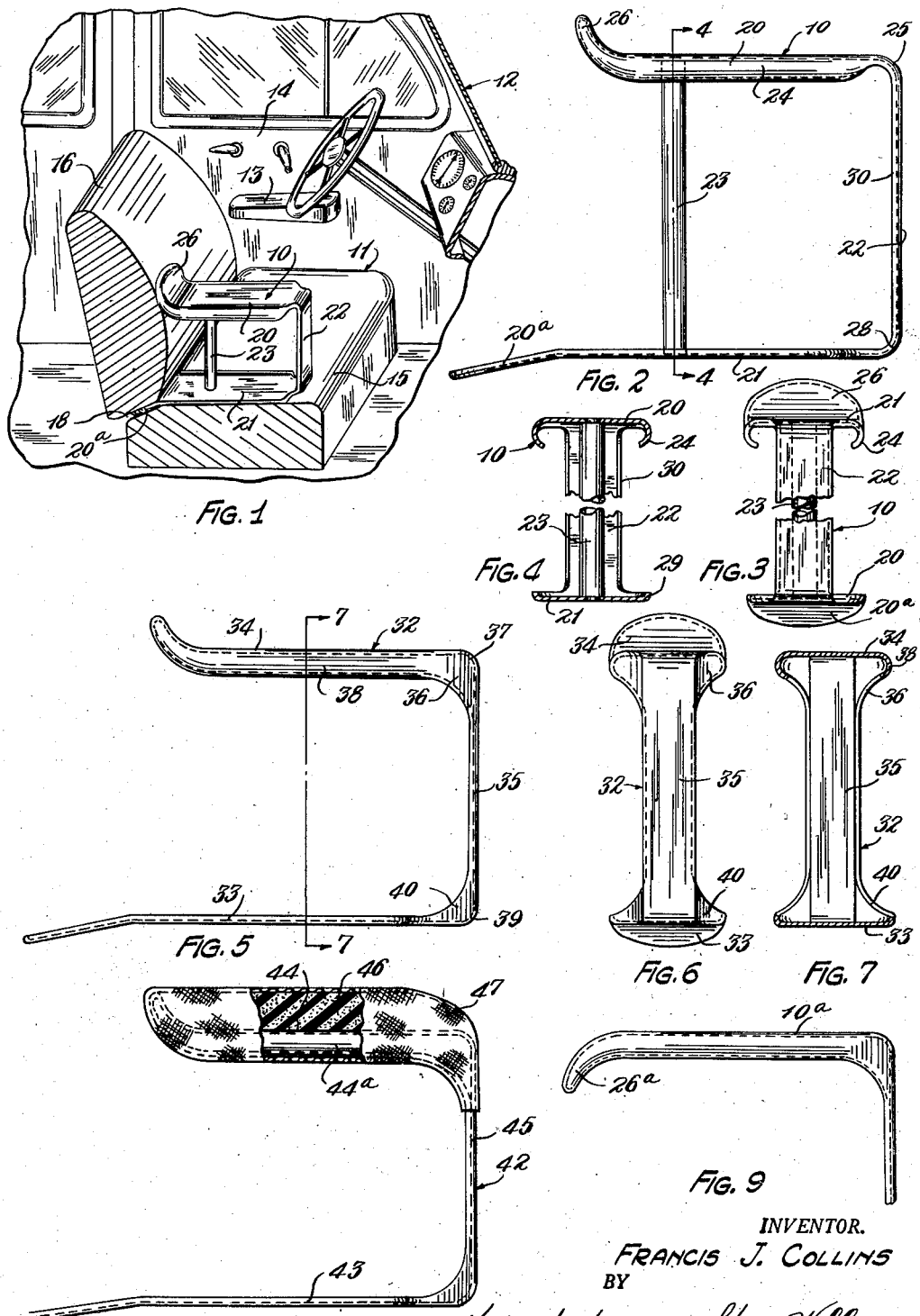
INVENTOR.
FRANCIS J. COLLINS
BY
Kwis, Hudson, Boughton & Williams
ATTORNEYS Patented Aug. 14, 1951

2,563,922

UNITED STATES PATENT OFFICE 2,563,922

ARMREST

Francis J. Collins, Cleveland Heights, Ohio

Application November 15, 1946, Serial No. 710,171

3 Claims. (Cl. 155—112)

This invention relates to portable or detachable arm rests for seats and particularly for use on the seats of automobiles and other vehicles.

An object of the present invention is to provide an arm rest device of this character which is of a very simple construction such that the device can be economically manufactured and can be conveniently handled and used for the purpose intended.

Another object of this invention is to provide an improved arm rest in the form of a self-contained unitary device which can be conveniently stored when not needed and which will be ready for instant use simply by placing the device in the desired position on the seat and which does not require the application or manipulation of fastening devices of any kind.

A further object is to provide an arm rest device of the character mentioned, which is especially applicable to a vehicle seat structure of the kind having seat and back rest members with a crevice therebetween and wherein the arm rest device is a portable unitary structure having a base portion adapted to rest on the seat member for supporting the device thereon in upright relation and the base portion has an extension portion adapted to be inserted into such crevice.

Still another object is to provide an improved construction for an arm rest device of the kind above mentioned, in which the top portion forms an arm support and has upholstery cushioning and covering material thereon.

Other objects and advantages of the invention will be apparent from the following detailed description and the accompanying sheet of drawings in which Fig. 1 is a partial perspective view showing the improved arm rest device being used on the driver's seat of an automobile;

Fig. 2 is a side elevation of the same arm rest device;

Fig. 3 is a front end view of the device;

Fig. 4 is a vertical sectional view of the device taken on line 4—4 of Fig. 2;

Fig. 5 is a side elevation showing a modified form of the arm rest device;

Fig. 6 is a front end view thereof;

Fig. 7 is a vertical sectional view taken on line 7—7 of Fig. 5;

Fig. 8 is a side view with portions broken away showing another modified form of the arm rest device, and Fig. 9 is a partial side elevation showing still another modified construction for the device.

As one embodiment of the invention Figs. 1 and 2 show an arm rest device 10 in the form of a portable or detachable unitary structure which can be placed in a desired location on a seat to provide an arm rest thereon. The device can be applied to various kinds of seat structures and can be used to advantage on the seats of automobiles and other vehicles for preventing or alleviating fatigue on long trips. Fig. 1 shows the arm rest device 10 being used on the front or driver's seat 11 of an automobile 12 for supporting or resting the driver's right arm and when so used it supplements the arm rest 13 usually provided on the door 14 of the vehicle.

The seat structure 11 is here shown as comprising a substantially horizontal seat member 15 and an upright back rest member 16. The seat and back rest members 15 and 16 are mounted on a suitable supporting structure so that the rear edge of the seat member and the lower edge of the back rest member are in contiguous relation and define a rearwardly and downwardly extending crevice 18 therebetween. The seat and back rest members 15 and 16 may be of any desired specific construction such as a conventional upholstered construction commonly employed in passenger vehicles.

The arm rest device 10 is of an open or skeleton-like construction comprising elongated, substantially parallel, top and base portions 20 and 21 and an upright connecting portion 22 which connects the top and base portions at the front end of the device. The top and base portions may also be connected at a second point as by means of an upright brace or post 23 extending therebetween and spaced rearwardly from the connecting portion 22. As shown in Figs. 1 and 2, the body of the arm rest device 10 is of a substantially U-shape in which the top and base portions 20 and 21 form the sides of the U-shape and the connecting portion 22 forms the bottom of the U-shape.

The U-shaped body of the arm rest device 10 can be made of any appropriate material but is preferably made of sheet material so that the device can be economically manufactured and will be strong, yet relatively light in weight. The sheet material used for this purpose can be a suitable form of sheet metal, such as sheet aluminum or sheet steel, or if desired, the sheet material can be a suitable form of non-metallic or plastic material.

The top portion 20 forms a substantially horizontally extending arm support and may be an elongated, substantially flat, plate-like portion having depending integral reinforcing beads or flanges 24 extending along its longitudinal side edges. The forward end of the top portion 20 is integrally joined to the upright connecting portion 22 by means of the rounded corner 25. The rear end of the top portion 20 has a curved, tail-like portion 26 formed as an integral rearward extension and providing a curved abutment which will engage and follow part-way along the curved surface of the front face of the back rest member 16 when the arm rest device is mounted in position for use as shown in Fig. 1.

Although Fig. 2 shows the curved abutment 26 as extending rearwardly and upwardly of the arm rest device 10, it can, if desired, be extended downwardly and rearwardly as shown at 26a in the modified arm rest device 10a of Fig. 9. The side flanges or beads 24 of the top portion 20 are preferably carried in continuous relation rearwardly into the curved abutment portion 26. These beads or flanges may be of a curved cross-sectional shape, as shown in Figs. 3 and 4, so as to impart a desired shape and smooth contour to the top portion of the device and to also give the device an attractive appearance.

The base portion 21 is of an elongated substantially flat, plate-like form having its forward end integrally joined to the upright connecting portion 22 by means of the rounded corner 28. The base portion 21 is of greater length than the top portion 20 and at its rear end has a downwardly and rearwardly inclined extension portion 20a which is engageable in the crevice 18 of the seat structure 11 when the arm rest device 10 is mounted thereon in position for use as shown in Fig. 1. The flat base portion 20 rests on the top surface of the seat member 15 and supports the arm rest device thereon in the upright relation shown in Fig. 1 and the engagement of the extension portion 20a in the crevice 18 causes the device to remain in the desired position on the seat structure. The base portion 21, including the extension 20a thereof, may be constructed with upturned, shallow, longitudinal flanges 29 extending along the side edges thereof. These flanges reinforce the base portion and also impart thereto a smooth and finished appearance.

The connecting portion 22 extends in upright relation at the front end of the device and forms a rigid support for the front end of the top portion 20. This connecting portion may have rearwardly extending shallow edge flanges or beads 30 thereon which can be carried in contiguous relation around the corners 25 and 28. The flanges 30 reinforce the upright connecting portion 22 and impart a smooth and finished characteristic thereto.

The connecting member 23 can be a brace or post of any appropriate form and having its ends riveted, welded or otherwise connected to the top and base portions 20 and 21. In this instance the connecting member 23 is in the form of a metal bar and forms a rigid connection which maintains the top and base portions in a fixed spaced relation at the rear end of the device.

In constructing the arm rest device 10, the U-shaped body thereof can be formed from a single piece or length of sheet material which is bent or otherwise formed to the U-shape so that the opposite end portions of the stock form the top and base portions 20 and 21 of the device and the intermediate portion of the stock forms the connecting portion 22. A desired cross-sectional shape for the top, base and connecting portions, such as these shapes described above, can be obtained by shaping these portions of the body of the device in appropriate dies or with appropriate tools. It is not necessary that the body of the arm rest device be made from a single piece of material since the top, base, and connecting portions can be separate pieces which have been formed to the desired shape and which pieces can then be welded, riveted, or otherwise connected together in the relative arrangement shown in the drawings for these portions of the device.

From the construction above described, it will be seen that the arm rest device 10 is in the form of an open, unitary structure, light in weight and adapted to be economically manufactured, and which can be easily handled and quickly mounted on a seat in the location at which it is desired to be used. In assembling the device on the seat structure it is only necessary to place the base portion 21 on the seat member 15 and insert the rear extension 20a into the crevice 18 so as to bring the curved abutment 26 into engagement with the front face of the back rest member 16. When the device is no longer needed it can be detached from the seat structure by simply lifting the device therefrom and simultaneously withdrawing the rear extension 20a from the crevice 18. The device can then be stored in a suitable space or compartment of the vehicle for future use.

Figs. 5, 6 and 7 show an arm rest device 32 which is similar to the arm rest device 10 described above but in which the base and top portions 33 and 34 are connected only by the upright front connecting portion 35. In this form of the device the connection between the top portion 34 and the upright portion 35 can be reinforced by providing a pair of webs 36 which extend across and form the side faces of the corner 37. The webs 36 are preferably formed as integral extensions of the longitudinal side flanges or beads 38 of the top portion 34. Similarly the corner 39 connecting the base portion 33 with the upright portion 35 is reinforced by a pair of webs 40 which extend across and form the side faces of this corner.

Fig. 8 of the drawings shows another modified arm rest device 42 having a substantially U-shaped body similar to that of the arm rest device 32 above described and which includes base and top portions 43 and 44 and an upright connecting portion 45. In this modified construction the top portion 44 has a longitudinally extending resilient pad or cushion 46 thereon and which is suitably secured thereto. The top portion 44 is also provided with a covering 47 of fabric or upholstering material which extends over the cushion 46 and around the side flanges or beads 44a of the top portion. The cushion 46 can be made of sponge rubber or the like in which case it can be cemented or vulcanized to the top portion 44. The fabric or upholstery covering 47 is here shown as being applied only to the top portion 44 of the arm rest device 42 but, if desired, it can be extended to also cover the upright portion 45 and the base portion 43.

When the arm rest device does not include the cushion 46 and the upholstery covering 47, as in the case of the arm rest device 10 described above, the device can have any desired finish; for example, when constructed of sheet steel it can be plated, painted or enameled; or when constructed of sheet aluminum it can have a bright metallic finish. When the device is made of a non-metallic sheet material such as plastic, the material can have a coloring substance of any desired shade incorporated therein.

From the foregoing description and the accompanying drawing it will now be readily understood that this invention provides a simple, light-weight and attractive arm rest device in the form of a portable unitary structure which can be economically manufactured and can be conveniently used in an automobile or other vehicle for improving the riding comfort of driver or passenger.

Although the arm rest device of this invention has been illustrated and described herein in some detail, it will be understood of course that the invention is not to be regarded as being correspondingly limited but includes all changes and modifications coming within the terms of the appended claims.

Having thus described my invention, I claim:

1. An arm rest device comprising a portable structure having a one-piece body made of sheet material and consisting of substantially parallel top and base portions and an upright portion connecting said top and base portions at one end of the device, said base portion having upturned longitudinal side edges and being adapted to rest on a seat for supporting the device thereon in upright relation and said top portion constituting an arm support and having down turned longitudinal side edges.

2. An arm rest device comprising a portable structure having a one-piece body made of sheet material and consisting of substantially parallel top and base portions, an upright portion at one end of the device, and corner portions connecting said top and base portions with said upright portion, said base portion being adapted to rest on a seat for supporting the device thereon in upright relation and said top portion constituting an arm support, said top and base portions having inturned longitudinal edge flanges thereon and said corner portions having reinforcing webs at the sides thereof which span the connections between the top and base portions and said upright portion, said webs being continuations of said edge flanges.

3. A detachable arm rest device for use with a vehicle seat structure of the kind having upholstered seat and back rest members with a rearwardly and downwardly extending crevice therebetween, comprising a portable unitary structure having a substantially C-shaped one-piece sheet metal body formed from a single strip of sheet metal, said sheet metal body having elongated substantially parallel top and base portions formed by end portions of said strip and a flat upright connecting portion at the front end thereof connecting said top and base portions and formed by an intermediate portion of said strip, said top portion being a wide flat portion forming an arm support and said base portion being a wide flat portion adapted to rest on the top of the upholstered seat member for supporting the device thereon, said wide flat top portion having the rear end thereof curved upwardly and adapted to abut against the front face of the upholstered back rest member and said wide flat base portion having a downwardly deflected rear end portion of a length to engage in said crevice when the curved rear end of said top member is in engagement with said back rest member.

FRANCIS J. COLLINS.

REFERENCES CITED

The following references are of record in the file of this patent:

UNITED STATES PATENTS

| Number | Name | Date |
|---|---|---|
| 236,428 | Hall | Jan. 11, 1881 |
| 645,176 | Marsh | Mar. 13, 1900 |
| 1,650,385 | Payton | Nov. 22, 1927 |
| 1,890,102 | Urguhart | Dec. 6, 1932 |
| 2,043,626 | Morrison | June 9, 1936 |
| 2,276,857 | Muller | Mar. 17, 1942 |
| 2,296,628 | Coppock | Sept. 22, 1942 |
| 2,365,003 | Reinholz | Dec. 12, 1944 |